Figure 1:
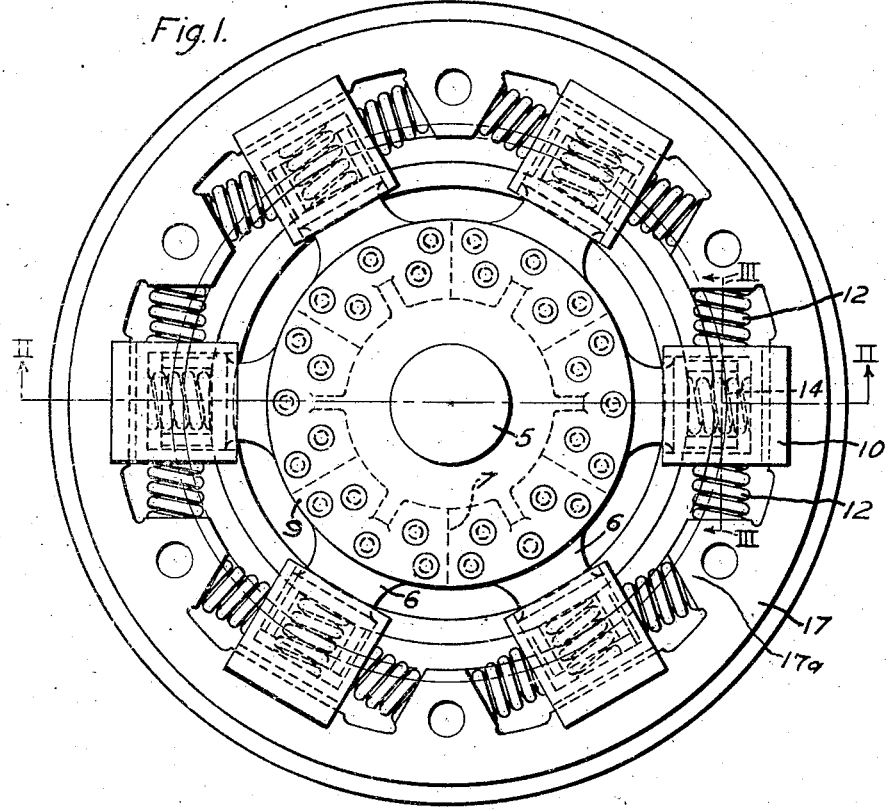

Dec. 28, 1926.　　　　　　　　　　　　　　　1,612,341
F. L. ALBEN
FLEXIBLE GEAR
Filed Sept. 20, 1923

WITNESSES:
J. H. English.
W. B. Jaspert.

INVENTOR
Frank L. Alben.
BY
Wesley S. Carr
ATTORNEY

Patented Dec. 28, 1926.

1,612,341

UNITED STATES PATENT OFFICE.

FRANK L. ALBEN, OF WILKINSBURG, PENNSYLVANIA, ASSIGNOR TO WESTINGHOUSE ELECTRIC & MANUFACTURING COMPANY, A CORPORATION OF PENNSYLVANIA.

FLEXIBLE GEAR.

Application filed September 20, 1923. Serial No. 663,737.

My invention relates to flexible wheel elements, more especially to flexible wheel structures that are especially adapted to railway vehicles.

It is among the objects of my invention to provide a flexible wheel structure of simple, compact and durable mechanical construction, which shall be adapted to reduce the stresses on the rails and which shall be capable of providing movement of the hub relative to the rim member.

Vehicle wheels are designed to eliminate the dead-weight on the axles as much as possible, consistent with the type of service and weight of the vehicle body that they support. In railway vehicles, the wheels are of relatively large proportions and comprise heavy masses which are very destructive in their engagement with the rails of the roadbed. The flanges and hubs of the wheels are subjected to shock and impact from the rough tracking conditions and bad joints of the rails.

My present invention is directed to a wheel structure that is designed to be yieldable under heavy loads, thereby eliminating the strain on the rails and the wheels themselves. Such flexibility to a great extent reduces the dead-weight on the axles and permits of relative movement of the center hub portion and the outer rim of each wheel.

My wheel structure comprises a hub and a rim member having a plurality of intermediate spokes which are flexibly connected to the hub portion to permit of resilient radial and angular movement, one end of each spoke being securely joined to the hub member, which also constitutes a gear hub on which a gear rim is secured.

Figure 2:
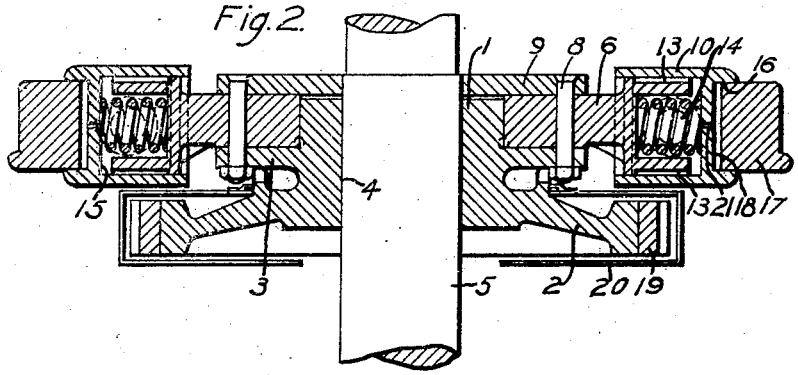
Figure 3:
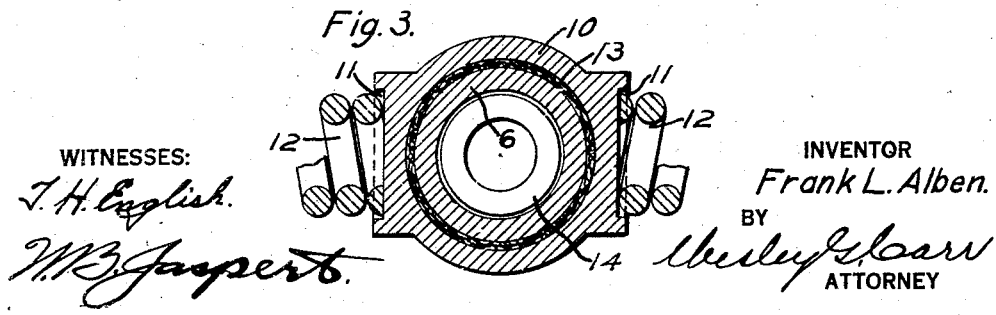

In the accompanying drawing constituting a part hereof and in which like reference characters designate like parts:

Fig. 1 is a side elevational view of a flexible wheel embodying the principles of my invention, Fig. 2 is a cross-sectional view taken along the line II—II of Fig. 1, and Fig. 3 is a cross-sectional view of a spring pocket taken along the line III—III of Fig. 1.

Referring to the drawing, the illustrated wheel structure comprises a hub 1 having a web or spider portion 2 and a radially extending flange 3 that is formed integrally therewith. The hub 1 is provided with a center opening 4 that is adapted to receive a drive shaft 5, such as the axle of a vehicle. A plurality of spokes 6 having ends 7 of substantially U-shape are disposed around the flanged portion 3 of the hub and are secured thereto by a plurality of rivets or bolts 8, which extend through a clamping plate 9 that is secured on the outside of the hub member.

The extended ends of the spokes 6 are annular in cross-section, as shown in Fig. 3, and are disposed in spring pockets 10 having lateral recesses 11 for receiving tangentially extending coil springs 12. One end of each spring 12 bears against one of a plurality of internal lugs 17a that extend radially from the wheel tire 17. A liner 13 of a material having good wearing qualities, such as gun metal, is provided between each spoke and spring pocket 6 and 10, respectively. Radially extending coil springs 14 are disposed in the hollow ends of the spokes 6 to extend to the bottoms 15 of the spring pockets 10.

The members 10 are severally provided with peripheral slots 16 for engaging the wheel tire or rim 17, and liners 18 are severally disposed therebetween to constitute wearing shoes. A gear rim 19 is secured on the web portion 2 of the hub 1, and a gear case 20 substantially encloses the web portion 2 and gear rim 19 to constitute a lubricating chamber. The spring pockets 10 are adapted to carry a lubricant for the wearing liners 13 and 18. A plurality of oil holes 21 are provided to permit lubrication of the liners 18.

In service, the operation of the hub 1 and the tire 17 is such as to permit resilient radial and angular relative movement thereof, limited by the springs 12 and 14, the spokes 6 moving along the liners 13 and tire 17 on the liners 18. The load on the axle will not be concentrated on the radial springs 14 on account of the angular disposition of the springs 12, which carry a portion of the load. The springs further function to absorb shock and impact from the tire, thus relieving the wheel axle and other more delicate connecting parts.

It is evident from the above description of my invention that a vehicle wheel made in accordance therewith provides novel functional characteristics which are highly desirable for railway operation, while the yieldingly mounted connecting portions thereof relieve the stresses acting upon the rim, flange, hub and axle members by their function of absorbing shock and impact and are yieldingly restrained from moving in a direction in which the force or blow is applied. Moreover, while the tire 17 and the hub 1 are relatively angularly and radially movable within limits, the parts are laterally stable; that is, movement parallel to the axle 5 is prevented.

Although I have described a specific embodiment of my invention it will be obvious to those skilled in the art that various modifications may be made in the design and proportion of the several parts constituting the wheel members without departing from the principles herein set forth.

I claim as my invention:—

1. A flexible element comprising a hub and a rim member having spring pockets in co-operative engagement therewith, said pockets having springs disposed radially and angularly with respect to said hub and said rim and bearing liners disposed intermediate the hub, spring pockets and rim.

2. A flexible element comprising a hub having spokes thereon and a co-operating rim, spring pockets disposed around the spokes of said hub and engaging said rim, a plurality of spring elements carried by said pockets and bearing liners disposed intermediate the spokes, spring pockets and rim.

3. A flexible element comprising a hub having spokes thereon and a cooperating rim, coil springs disposed on said spokes, and coil springs extending at right angles to said spokes in engagement with said rim and bearing liners disposed intermediate the spokes and rim.

4. A flexible element comprising a hub having spokes thereon and a co-operating rim, spring pockets disposed around the spokes of said hub and engaging said rim, coil springs disposed on said spokes, coil springs extending at right angles to said spokes in engagement with said pockets, and bearing liners disposed intermediate the spokes, webs, spring pockets, and rim.

5. A flexible element comprising a hub, a rim, a plurality of spokes secured to said hub, spring pockets disposed intermediate said rim and said spokes and being movable relative thereto, bearing bushings on the ends of said spokes, liners intermediate said rim and pockets, and coil springs in said pockets to yieldingly restrain movement thereof.

In testimony whereof, I have hereunto subscribed my name this 11th day of September 1923.

FRANK L. ALBEN.